Nov. 6, 1962          G. M. WHITE          3,062,941
RADIATION-SENSITIVE INFRARED CONTROL
Filed Dec. 14, 1959
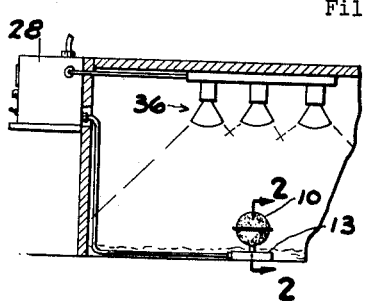
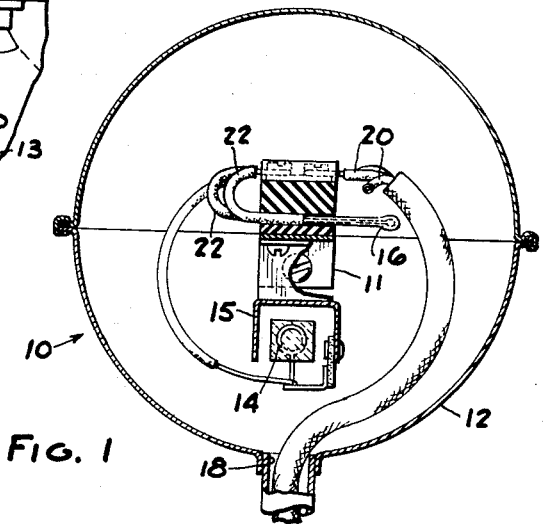
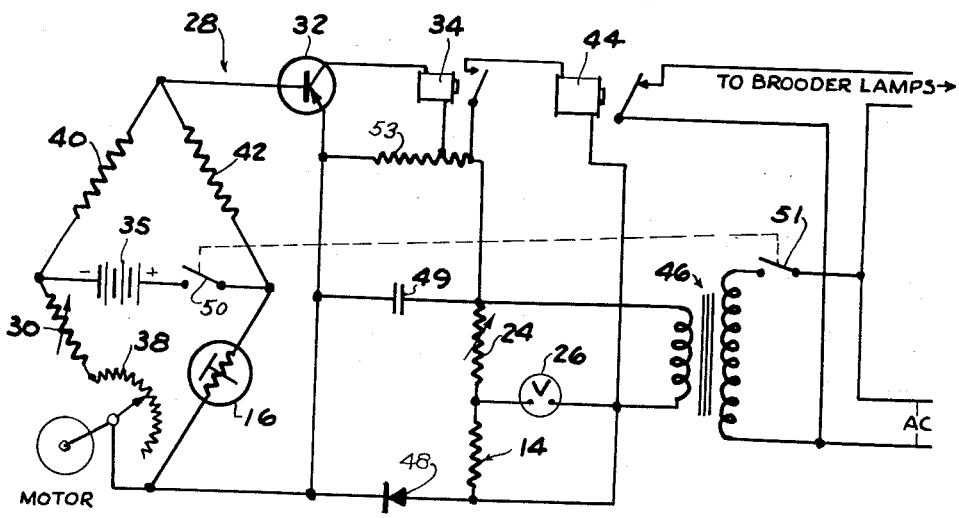
INVENTOR.
GERALD M. WHITE
BY
WILSON, LEWIS & McRAE
ATTORNEYS United States Patent Office 3,062,941
Patented Nov. 6, 1962

3,062,941
RADIATION-SENSITIVE INFRARED CONTROL
Gerald M. White, West Lafayette, Ind., assignor to Purdue Research Foundation, Lafayette, Ind., a non-profit corporation of Indiana
Filed Dec. 14, 1959, Ser. No. 859,257
13 Claims. (Cl. 219—20)

The present invention relates to a radiation-sensitive infrared control device and more particularly to an infrared control device for the control of infrared heaters utilized for animal heating.

Infrared heating units are currently being widely adapted to brooders and other animal enclosures for heating animals such as baby chicks and other poultry, piglets, and the like. The infrared units used for such heating are both the standard electrically powered lamps and the recently developed gas-operated infrared generators. The objective of an infrared heating system is to warm the animal directly with the infrared rays rather than, as in conventional heating practice, to warm the surrounding air to provide a comfortable ambient temperature for the animals. Advantages of infrared heating reside in more healthful conditions for the animals and lower operating costs.

Control devices for heating systems proposed heretofore have generally been of the type which primarily respond to the air temperature. While such devices will give a rough indication of the existing conditions in an infrared system, they are not capable of controlling the heating system with the desired accuracy. The heat requirements of, for example, baby chicks are critical during the first days of their lives and unless the heat control is accurate, there is a high death incidence during this period.

It is, therefore, an object of this invention to provide an infrared control device which is responsive to infrared radiation, convection losses, and air temperature.

Another object of the invention is to provide such a control device which will accurately control the amount of energy supplied by an infrared emitter irrespective of changing infrared emitter characteristics as distinguished from a control not directly sensing radiant energy which would be affected by changing emitter characteristics.

A further object is to provide a control device which may be quickly and easily adjusted to vary the amount of radiant energy supplied.

Another object of the invention is to provide proportional time cycling for turning the infrared emitters on and off whereby to increase the frequency of the "on-off" cycles and thus reduce the tendency to chill the animals due to long "off" periods and also to permit the control to function more accurately in that it reduces the amount of temperature overshoot which occurs in the sensing portion of the device.

A still further object is to provide a control device which will conserve heat energy, particularly in that it will take into account both natural solar energy and artificial energy emitted from infrared generators.

Other objects of this invention will appear in the following description and appended claims, reference being had to the accompanying drawings forming a part of this specification wherein like reference characters designate corresponding parts in the several views.

In the drawings:

FIG. 1 is a sectional view of one embodiment of the sensing device of the present invention.

FIG. 2 is an electrical schematic view illustrating the use of the FIG. 1 sensing unit in a control circuit for controlling the operation of a chick brooder.

FIG. 3 is a view showing the sensing unit positioned in a brooder.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The invention will be described hereafter in connection with a chick brooder. However, as will be readily apparent, it could also be employed for use with other infrared-heated animal enclosures. Further, it is believed that it may also have application to greenhouse operations.

The primary requirement of any brooder control is that it maintain a comfortable environment in the brooder without any unnecessary expenditure of energy. In most chick brooders the energy supplied to the brooder is directly related to the brooder air temperature. This stems from the fact that most brooders are controlled by thermostats which are primarily sensitive to air temperature. In infrared brooders, however, air temperature alone does not determine when optimum brooding conditions exist. This is because the infrared energy from the brooder lamps is transmitted to the chickens under the brooder without appreciably heating the air through which it passes; therefore, the chickens can be comfortable at somewhat lower air temperatures than those found to be necessary in other types of brooders. The ordinary thermostat possesses definite disadvantages as an infrared brooder control because the brooder air temperature alone cannot be used as an indication of the heat received by the chickens. The present invention provides a control to automatically regulate the energy level in, for example, infrared chicken brooders. The control is responsive to both radiation and convection as well as to the brooder air temperature.

Chicks under a brooder normally lose heat to their environment because their body temperature is generally higher than the ambient temperature. The function of a brooder control is to regulate the rate of this loss by controlling the environmental temperature, or as in the present case, by supplying the radiant energy necessary for chicken comfort from such sources as infrared lamps.

In order to properly regulate the rate of heat loss of a chick in an infrared brooder, the control must take into account the ambient temperature, the heat received from the infrared emitter, and the heat lost by convection.

The key component of the control of this invention is the sensing unit 10 shown in FIG. 1. Although the comparison is not exact, the sensing unit in several respects simulates, or is the equivalent of, a baby chick. The unit 10 comprises a hollow two-piece globular casing 12 in which are mounted, by means of bracket 11, an electrical heating element 14 and a thermistor 16. The thermistor 16 is protected from radiant energy emitted by the element 14 by means of a shield 15. The thermistor is a temperature sensitive resistor having a high negative temperature coefficient of resistivity and is located near the center of the control globe. An opening 18 is provided in the globe 12 for leads 20, 22 which are respectively connected to the heater and thermistor.

In order to simulate the reactions of chicks beneath the infrared emittters, the globe 12 is preferably located just above the litter and beneath the infrared emitters as shown in FIG. 3. For this purpose the globe 12 may be mounted on a base 13 which rests on the floor. The spherical shape of the globe is advantageous in that it absorbs and emits radiant energy equally well in all directions. However, other shapes could be used if desired. For example, the upper portion of the globe may be made in the shape of a spire to prevent chicks from roosting on the globe. The exterior of the globe 12 is preferably coated with a material having a high emissivity so that it will absorb most of the radiant energy incident upon its surface. Flat black paint is desirable for this purpose as it has an emissivity of .96 to .98. This emissivity is considered to approximate the emissivity of a chick.

The globe 12 is heated by heater 14 primarily to permit accurate measurement of the amount of heat lost by the chicks due to convection. Secondarily, heating the globe increases its sensitivity to radiation losses. However, if it were not for the losses due to convection, theoretically the globe temperature would not have to be regulated.

The globe emits radiant energy proportional to the fourth power of its absolute temperature in accordance with the Stefan-Boltzmann law. The net radiant interchange between the sensing element and its surroundings can be expressed as:

$$qr = \epsilon \sigma A(T_1^4 - T_2^4)$$

where:

$\epsilon$ = emissivity of the globe surface
$\sigma$ = Stefan-Boltzmann's natural constant ($0.174 \times 10^{-8}$ B hr.$^{-1}$ ft.$^{-2}$ R$^{-4}$)
$A$ = area of the sphere in square feet
$T_1$ = absolute temperature of the sphere
$T_2$ = absolute temperature of the surroundings If radiation alone is considered it is evident that when there is a net gain of radiant energy from an external source, the steady state temperature of the sensing element will be higher than that of the ambient air. Therefore, the globe temperature will be higher than the brooder air temperature in an infrared brooder except for those periods when no radiant energy is required by the chicks.

However, a different problem exists with convection heat transfer. The convective heat transfer from the element can be expressed by the following equation given by Bedford and Warner for the globe thermometer ("The Globe Thermometer in Studies of Heating and Ventilation," Journal of Hygiene, vol. 34, No. 4, pp. 458–473, December 1934):

$$qc = 0.181\sqrt{V}(T_1 - T_2)$$

where:

$qc$ = net convective heat transfer between the sphere and its surroundings per square foot of area.
$0.181$ = convective coefficient for a four inch diameter globe utilized in one embodiment of the invention.
$V$ = velocity of air across the globe in feet per minute.

This equation indicates that the rate of heat transfer from the globe by convection is directly proportional to the square root of air velocity and also to the temperature difference between the globe and its surrounding air. If the sensing globe is considered when its temperature is the same as that of the surrounding air, it is clear from the above equation that no convective heat transfer will occur between the globe and its environment; therefore, its internal temperature is not affected by air movement. This means that there will be no indication of the increased convective heat loss from the chickens in the brooder due to an increased air velocity at this point.

To overcome the above limitation and to increase the sphere's sensitivity to radiation, the temperature of the sensing sphere in this control is thermostatically regulated near the body temperature of a chicken. It is assumed that heat transfer equations similar to those given for a 4-inch globe can also be applied to baby chickens. On this basis the rate of heat transfer from the sensing element by radiation and convection is presumed to be affected by environmental conditions in a manner similar to that from a chicken.

The heat energy necessary to maintain the globe temperature at the above set point is derived from two sources; some is supplied continuously through the electrical resistance element 14 mounted within the sphere and the remainder is supplied intermittently by the infrared emitters.

The component of heat supplied by the internal heater is varied with chicken age. To determine the magnitude of this heater input at any chick age the power required to maintain the globe at the control temperature has been experimentally measured over a range of ambient temperatures. Barott and Pringle (Barott, H. G., and Emma M. Pringle, "Effect of Environment on Growth and Feed and Water Consumption of Chickens," II, "The Effect of Temperature and Humidity of Environment During the First Eighteen Days After Hatch," Journal of Nutrition, vol. 37, No. 1, pp. 153–162, January 1949, and "Effect of Environment on Growth and Feed and Water Consumption of Chickens," III, "The Effect of Temperature of Environment During the Period From Eighteen to Thirty-Two Days of Age," Journal of Nutrition, vol. 41, No. 1, pp. 25–30, May 1950) have published values of optimum ambient temperature for baby chicks from birth to 32 days of age. In an infrared brooder it is desirable to have no radiant energy input when the brooder temperature is optimum. For this reason, the rate at which energy is supplied by the globe heater at any chick age has been taken equal to the power required to maintain the sphere's temperature at the set point when the ambient temperature is optimum. These power settings may be obtained from the results of the above-mentioned experiments. A rheostat 24 and a calibrated voltmeter 26 are used to adjust this input with chick age. This heater adjustment allows the globe to maintain its internal temperature without any additional radiant energy from the lamps in progressively cooler surroundings. This is equivalent to the reduction in brooding temperature with chick age in conventional heated-air brooders.

Whenever the ambient temperature in the brooder drops below optimum brooding temperature the heat input from the internal heater is insufficient to maintain the globe temperature at the control point, and so additional energy must be supplied to the globe from the infrared brooder lamps; thereby maintaining the level of chicken comfort beneath the brooder.

FIG. 2 illustrates a control circuit 28 which is operative, in response to the sensing unit 10, to actuate switching means to turn the infrared emitters 36 off and on as required. As shown, A.C. power is applied to stepdown transformer 46 of the control circuit. The A.C. current is rectified by rectifier 48 and filtered by capacitor 49. The capacitor 49 provides the D.C. collector to emitter voltage for the P.N.P. transistor 32. Resistor 53 is tapped at a point to provide the proper operating voltage for the collector.

The collector of transistor 32 is adapted to conduct when no radiant energy is required by the chicks. When the collector conducts, the current will close normally open sensitive relay 34 which in turn will cause normally closed power relay 44 to open, thus opening the circuit to the infrared emitters 36. When the collector ceases to conduct, the reverse procedure will take place to result in the emitters 36 being turned on.

Control of the collector current is effectuated through control of the emitter current. It is of course known that a P.N.P. transistor will conduct when the emitter is positive with respect to the base and that there must be an emitter current in order for the collector current to flow. Therefore, by controlling the emitter to base voltage, it is possible to effectuate the desired switching action.

This voltage is controlled by a D.C. "bridge" type circuit which includes a pair of voltage divider networks and a source of D.C. power, shown as a battery 35. One network includes the battery 35 and fixed resistors 40, 42 which divide the voltage of the battery. The base voltage, which is somewhat less than the battery 35 voltage, is tapped off between resistors 40, 42. The second voltage divider network includes battery 35, manually-adjustable rheostat 30, motor driven rheostat 38, and thermistor 16. The emitter voltage, which is also somewhat less than the battery 35 voltage, is tapped off between the thermistor 16 and rheostats 30, 38.

In operation, when the temperature of sensing unit 10 increases, the resistance of the thermistor 16 decreases. Decrease of the thermistor resistance results in an increase in the voltage of the emitter, causing this voltage to tend to become positive with respect to the base voltage, which is fixed. By selecting the proper value for rheostat 30, the emitter voltage will become positive with respect to the base voltage at the desired temperature of sensing unit 10. This will cause transistor 32 to conduct, thus opening the circuit to the infrared emitters 36. The reverse will of course occur when the temperature of the sensing unit 10 drops below the preselected value. Ganged switches 50, 51 are provided as shutoff switches for the two power supplies.

While a battery 35 has been shown as the source of D.C. power, it will be appreciated that other power sources could be used, such as a transformer and rectifier operating from an A.C. power supply.

When the control is in operation, a considerable transfer lag occurs between the time the heat is added by the emitters 36 and the time at which it is sensed by the thermistor sensing element inside the globe. To reduce the effect of this lag on the accuracy of the temperature control within the globe, a proportional-time cycle, control is provided for use in conjunction with the rheostat 30. This feature evens out the input of the infrared emitters and thereby lessens the influence of transfer lag on temperature control within the sensing globe.

The proportional-time cycle is produced as shown in FIG. 2 by using a low resistance motor-driven rheostat 38 in series with the main adjusting rheostat 30 of the bridge. Rotation of this variable resistor continually cycles the balance point of the bridge over a range of about 3° F. at a frequency of 4 cycles per minute. This arrangement in effect, sweeps the thermostatic setting of the control back and forth across a 3 degree band every 15 seconds. Thus, when the sensing sphere's temperature is within this proportional band the emitters are turned on for a portion of each cycle, with the length of these "on" periods being proportional to the deviation of the globe temperature from the controller set point. Above the 3 degree band the emitters are off continuously, and below this range they are on continuously.

The proportional-time cycle control, in addition to reducing the amount of overshoot of the controlled temperature beyond the set point, also increases the comfort of the chickens beneath the brooder by shortening the periods during which the emitters are off. Long periods without any radiant heat in an infrared brooder tend to cause chicken discomfort due to chilling.

As may be appreciated, the present control could be used for controlling a gas operated infrared heater by means, for example, of an electrically operated solenoid valve placed in the gas line.

It will also be appreciated that temperature responsive elements other than the thermistor 16 could be used in conjunction with various control circuits to accomplish the desired switching action. For example, a thermocouple having an amplifier to increase the signal strength to operate a thyratron tube could be employed.

In any one brooder, the setting of the globe temperature depends on several factors such as: the location of the globe beneath the brooder, the infrared energy pattern of the infrared emitters; the chick energy requirements based on chick breed, health, etc. For this reason, it is recommended that the globe be placed in an area of maximum infrared energy and that its temperature be adjusted to obtain chick comfort at the beginning of the brooding period. After this initial adjustment, it should only be necessary to adjust the globe heater input with chick age.

Having thus described my invention, I claim:

1. In a heat sensing unit sensing the combined effect of air temperature and heat radiation in a space heated by an infrared source, a hollow casing forming an enclosure for a body of air adapted to be positioned in the space heated by the infrared source; the outer surface of the casing having an emissivity such that it will absorb a significant portion of radiant energy incident thereon to raise the temperature of the hollow interior of the casing; a heating element within the casing and spaced from the casing walls to heat the hollow interior of the casing; and a temperature responsive control element within the casing and spaced from the casing walls operative in response to variations in the ambient temperature of the hollow interior of the casing to control the operation of the infrared source.

2. A device as claimed in claim 1 and further characterized in that the outer surface of the casing has an emissivity above .90.

3. A device as claimed in claim 1 and further characterized in that the outer surface of the casing is black.

4. A device as claimed in claim 1 and further characterized in that the casing is spherical in shape.

5. A device as claimed in claim 1 and further characterized in that the temperature responsive element is a thermistor.

6. A device as claimed in claim 1 and further characterized in that the output of the heating element is selectively adjustable.

7. In a heat sensing unit for an infrared heating system comprising a hollow casing forming an enclosure for a body of air adapted to be positioned in a space heated by an infrared source; the outer surface of the casing having an emissivity such that it will absorb the major portion of radiant energy incident thereon to raise the temperature of the hollow interior of the casing; a heating element having a preselected heat output within the casing and spaced from the casing walls to heat the hollow interior of the casing; and a temperature responsive control element within the casing and spaced from the casing walls operative in response to the ambient temperature of the hollow interior of the casing to control the operation of the infrared source.

8. In an animal brooder, the combination comprising a brooder housing structure; an infrared source of heat to warm animals contained in the housing structure; a heat sensing unit for controlling the infrared heating source; said sensing unit comprising a casing positioned within the housing structure; the outer surface of the casing having an emissivity such that it will absorb a significant portion of the radiant energy incident thereon to raise the temperature of the interior space of the casing; a heating unit within the casing to heat the interior space of the casing; and a temperature responsive control element within the casing operative in response to the temperature of the interior space of the casing to control the operation of the infrared heating source.

9. In an animal brooder, the combination comprising a brooder housing structure for animals; an infrared heating source to warm animals contained within the housing structure; and a heat sensing unit positioned within the housing structure for controlling the infrared heating source to maintain a predetermined comfort level for the animals; the heat sensing unit comprising a casing positioned in the housing structure to receive radiant energy from the infrared heating source; the casing absorbing the major portion of radiant energy incident thereon to raise the temperature of the interior space of the casing; a heating element having a preselected heat output within the casing to heat the interior space of the casing; and a temperature responsive control element within the casing operative in response to the temperature of the interior space of the casing to control the operation of the infrared source to maintain the aforementioned comfort level.

10. The combination of a system for controlling the energy output of an infrared heater in response to heat energy requirements, comprising an infrared heater emitting primarily infrared radiant energy; on-off switching means for the heater; and a heat sensing unit positioned to receive infrared energy from the heater and being operably connected to the switching means for actuation thereof; said heat sensing unit comprising a casing; the outer surface of the casing having an emissivity such that it will absorb a significant portion of radiant energy incident thereon to raise the temperature of the interior space of the casing; the heating element having a preselected heat output within the casing to heat the interior space of the casing; and a temperature responsive control element within the casing operative in response to the temperature of the interior space of the casing to control the operation of the infrared heater.

11. The combination of a system for controlling the energy output of an infrared heater in response to heat energy requirements comprising an infrared heater emitting primarily infrared radiant energy; on-off switching means for the heater; a control circuit for operating the switching means; a heat sensing unit for actuating the control circuit in accordance with heat energy requirements; said heat sensing unit comprising a casing positioned to receive infrared energy from the heater; the outer surface of the casing having an emissivity such that it will absorb a significant portion of radiant energy incident thereon to raise the temperature of the interior space of the casing; a heating element having a preselected heat output within the casing to heat the interior space of the casing; and a temperature responsive control element within the casing operative in response to variations of the temperature of the interior space of the casing to actuate the control circuit to control the operation of the infrared heater.

12. The combination of claim 11 and further characterized in that the temperature of the interior space of the casing at which the control circuit is actuated by the temperature responsive control element is selectively variable.

13. The combination of claim 11 and further characterized in that a proportional-time cycle control is provided in the control circuit; said proportional-time cycle control comprising a motor-driven rheostat to continuously vary within defined limits the temperature of the interior space of the casing at which the control circuit is actuated by the temperature responsive control element.

References Cited in the file of this patent

UNITED STATES PATENTS

| | | |
|---|---|---|
| 1,923,998 | Payne | Aug. 22, 1933 |
| 2,261,582 | Haines | Nov. 4, 1941 |
| 2,651,704 | Prior | Sept. 8, 1953 |
| 2,819,371 | Aldrich et al. | Jan. 7, 1958 |
| 2,826,072 | Kliever | Mar. 11, 1958 |
| 2,859,402 | Schaeve | Nov. 4, 1958 |
| 2,952,762 | Williams et al. | Sept. 13, 1960 |

OTHER REFERENCES

Wilson: Electronics; December 1950; pp. 84—87.